United States Patent [19]
Faruque

[11] Patent Number: 5,802,474
[45] Date of Patent: Sep. 1, 1998

[54] DIRECTIONAL FREQUENCY ALLOCATION IN AN N=6 CELLULAR RADIO SYSTEM

[75] Inventor: Saleh Faruque, Plano, Tex.

[73] Assignee: Northern Telecom Limited

[21] Appl. No.: 667,831

[22] Filed: Jun. 20, 1996

[51] Int. Cl.$^6$ .................................................. H04Q 7/20
[52] U.S. Cl. .................................................. 455/447; 455/450
[58] Field of Search .................... 455/62, 63, 422, 455/446, 447, 448, 450, 452, 524

[56] References Cited

U.S. PATENT DOCUMENTS

| | | | |
|---|---|---|---|
| 4,128,740 | 12/1978 | Graziano | 455/447 |
| 5,247,699 | 9/1993 | Hartman | 455/449 |
| 5,402,413 | 3/1995 | Dixon | 455/447 |
| 5,428,818 | 6/1995 | Meidan et al. | 455/450 |

OTHER PUBLICATIONS

Michel Mouly, *Regular Cellular Reuse Patterns*, Jul. 1991, IEEE, pp. 681–688.

*Primary Examiner*—Reinhard J. Eisenzopf
*Assistant Examiner*—Sam Bhattacharya
*Attorney, Agent, or Firm*—Kenneth W. Bolvin; John D. Crane

[57] ABSTRACT

The process of the present invention is based on a tri-cellular platform where nine, or a multiple of nine, frequency groups are directionalized and reused in the same direction. Directional antennas are located in the center of the tri-cell group. Each antenna radiates into a 120° sector of each cell, effectively radiating the entire cell from the corner. The reused frequency groups are aligned along the 0°, 120°, and 240° axes of each tri-cell group. The frequency groups are reused in the same direction along each axis, reducing the number of dominant interfering cells to one.

9 Claims, 1 Drawing Sheet

5,802,474

DIRECTIONAL FREQUENCY ALLOCATION IN AN N=6 CELLULAR RADIO SYSTEM

BACKGROUND OF THE INVENTION

I. Field of the Invention

The present invention relates to radio communications. More particularly, the present invention relates to cellular radiotelephone communications.

II. Description of the Related Art

Cellular radiotelephone systems enable mobile subscribers to communicate with land-line telephone networks while moving through a geographical area. High density, high capacity cells in typical cellular radiotelephone systems are made up of six directional antennas centrally located in the cell. Each antenna radiates into a 60° sector of the cell. A number of these cells are combined to form the cellular radiotelephone system.

The cell shapes are determined by both the radiation pattern of the antennas and the local conditions at the cell site. Cells, however, are typically idealized as hexagonal patterns since such a pattern closely approximates the ideal antenna radiation pattern.

Cellular radiotelephone systems use different channel frequencies for each mobile subscriber. The transmission from the mobile to the cell uses one frequency while the transmission from the cell to the mobile user uses another frequency. These two frequencies are not used by other nearby mobiles as this would lead to interference on the channel and a reduction in signal quality. This interference is referred to in the art as co-channel interference.

Another type of interference experienced by mobile subscribers is adjacent channel interference. This interference is due to the energy slipover between adjacent channels.

Both types of interference affect the signal quality, referred to as the carrier to interference ratio (C/I). This ratio is the signal strength of the received desired carrier to the signal strength of the received interfering carriers. A number of physical factors can also affect C/I in cellular systems including: buildings, geography, antenna radiation patterns, mobile traffic transmitting power, and mobile traffic location within the cell.

Due to the low power of the cell's transmitters, the same frequencies can be reused in other cells, referred to as co-channel cells, in the same geographical area. Greater frequency reuse allows more mobile traffic to use the cellular system. There are, however, constraints on the location of the co-channel cells. Even though the transmitters are typically low power, placing co-channel cells too close may cause interference.

Frequency planning optimizes spectrum usage, enhances channel capacity and reduces interference. A frequency plan also ensures adequate channel isolation to avoid energy slipover between channels, so that adjacent channel interference is reduced. Moreover, an adequate repeat distance is provided to an extent where co-channel interference is acceptable while maintaining a high channel capacity. In order to accomplish these diverse requirements, a compromise is generally made so that the target C/I performance is acquired without jeopardizing the system capacity. However, the existing frequency planning schemes do not always permit this. As a result, with growing cellular subscribers, today's cellular networks are overloaded and do not provide an adequate service.

A prior art method of symmetrical frequency planning begins with two integers, i and j, that are referred to as shift parameters. The frequency plan is established by starting with a reference cell and moving over i cells along the chain of cells. After reaching the $i^{th}$ cell, a counter-clockwise turn of 60° is made and another move of j cells is made. The $j^{th}$ cell can safely be a co-channel cell. The frequency plan can also be established by moving j cells before turning i cells or by turning 60° clockwise.

After all the possible co-channel cells of the initial cell are laid out, another reference cell is chosen and the procedure is repeated. this entire procedure is repeated as often as necessary to establish the frequency plan of the entire metropolitan cellular system.

The cells thus established by the above procedure form a reuse pattern of $i^2+ij+j^2$ cells. The number of cells in this reuse pattern is a predominant concern of the cellular industry since this number determines how many different channel groups can be formed out of the frequency spectrum allocated to cellular radiotelephones. A low number of cells in a reuse pattern means more channel groups can be formed and more users accommodated.

Another method for determining frequency reuse is illustrated in U.S. Pat. No. 5,483,667 to Faruque and assigned to Northern Telecom Limited and incorporated herein by reference. This patent teaches an N=3 frequency plan using 60° sectors and divides the channels into 18 frequency groups. This provides 395/18=22 voice channels per sector or 22×6= 132 voice channels per cell with a reuse distance of $D/R=\sqrt{3N}=\sqrt{3\cdot3}=3$.

In the Advanced Mobile Phone System (AMPS) used in North America, 416 frequencies are available for cellular use. These 416 frequencies must be divided among the cells and reused as necessary to provide coverage to a metropolitan or other geographical area. Additionally, 21 of these channel frequencies must be used as control frequencies to establish calls between users and cells. This further reduces the number of channels to 395 for use as voice channels. There is still a need for even greater frequency reuse to expand the capacity of the cellular system without performance degradation.

SUMMARY OF THE PRESENT INVENTION

The present invention encompasses a process for frequency allocation in a cellular radio system. The process creates a tri-cell group from three cells of the cellular system. Seven of the tri-cell groups are then formed into a cellular cluster where antenna front emission to back emission ratio is fully exploited to isolate a repeat frequency. As a result, the number of dominant interfering cells is reduced to one.

The available frequencies are grouped into a predetermined number of frequency groups. In the preferred embodiment, the frequencies are grouped into nine or a multiple of nine frequency groups.

An antenna array comprised of directional antennas is positioned relatively close to the center of each tri-cell group. Since the idealized form of a cell is a hexagon, the antennas are positioned at the point where all three cells meet. Each antenna radiates into a predetermined sector of the tri-cell group. In the preferred embodiment, the sector is a 120° radiation pattern.

Since directional antennas are used in each sector, the worst case co-channel interference is from three directions, 120° apart. Therefore, for maximum co-channel isolation, frequency groups should be reused on these three axes only. The preferred embodiment alternates a first frequency group with another frequency group along an axis.

DETAILED DESCRIPTION OF THE PREFERRED EMBODIMENT

The directional frequency allocation plan of the present invention exploits the antenna front-to-back ratio to yield additional C/I margin and provide greater frequency reuse, thereby increasing user capacity. In this process, a group of channels is reused in the same direction that the antenna is pointing, thus fully exploiting the antenna front-to-back ratio. The present invention, utilizes the antenna front-to-back ratio, where the number of dominant interfering cells is reduced to one.

Figure 1:
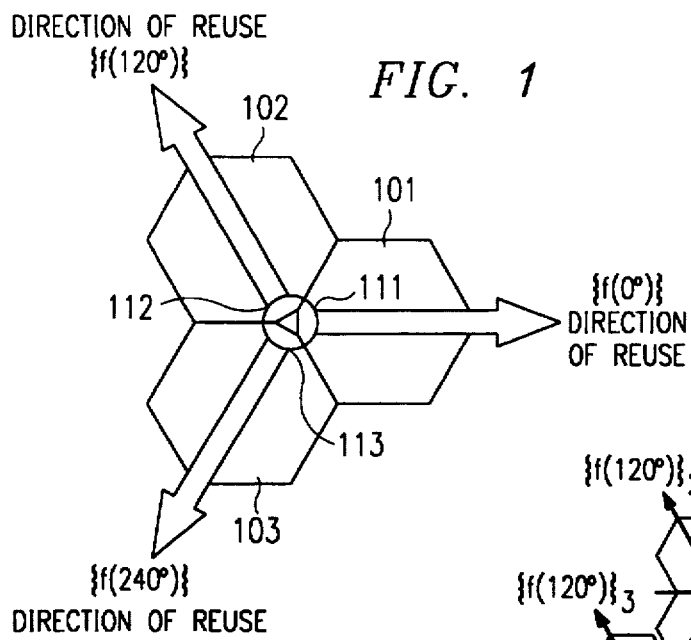
FIG. 1 shows the principle of directional frequency reuse based on a tri-cellular platform.

A tri-cell group, illustrated in FIG. 1, is comprised of three identical cells (101–103) that have directional antennas (111–113) in the center of the group. Each antenna (111–113) radiates into a 120° sector of the group. In this case, the 120° sector covers the entire cell (101–103) such that each cell (101–103) is treated as a logical omnidirectional cell instead of as a sector. Since the hexagons are only an ideal representation of the cell structure, the antennas may not be implemented exactly in the center of the group but may be offset somewhat due to geography, buildings, or cell requirements.

The worst case interference is due to only one interfering cell from the same direction. The three axes of reuse, as seen in FIG. 1, are subsequently referred to as $\{f(0°)\}$, $\{f(120°)\}$, and $\{f(240°)\}$.

Figure 2:
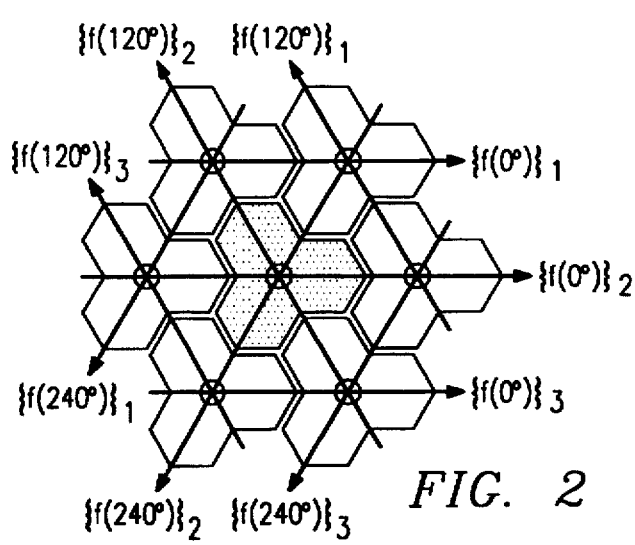
FIG. 2 shows a cluster of seven tri-cell groups illustrating a 9 frequency directional reuse plan.

The novel principle of directional reuse illustrated in FIG. 1 is expanded in FIG. 2. FIG. 2 illustrates using seven of the tri-cellular platforms to form a tri-cellular cluster. In this embodiment, each of the three axes are comprised of three parallel layers. These layers are designated as:

| | | |
|---|---|---|
| $\{f(0°)\}_1$ | along the 0° axis | (1) |
| $\{f(0°)\}_2$ | | |
| $\{f(0°)\}_3$ | | |
| $\{f(120°)\}_1$ | along the 120° axis | (2) |
| $\{f(120°)\}_2$ | | |
| $\{f(120°)\}_3$ | | |
| $\{f(240°)\}_1$ | along the 240° axis | (3) |
| $\{f(240°)\}_2$ | | |
| $\{f(240°)\}_3$ | | |

The directional frequency assignment of the present invention results in a total of 9 layers, three in each direction. According to the preferred embodiment, a frequency group is reused only in each direction. 9 or a multiple of 9 frequency groups are required. Therefore, the available 395 voice channels are divided up into 9 or a multiple of 9 frequency groups. These groups are then directionalized and distributed among the tri-cell groups as subsequently discussed.

Figure 3:
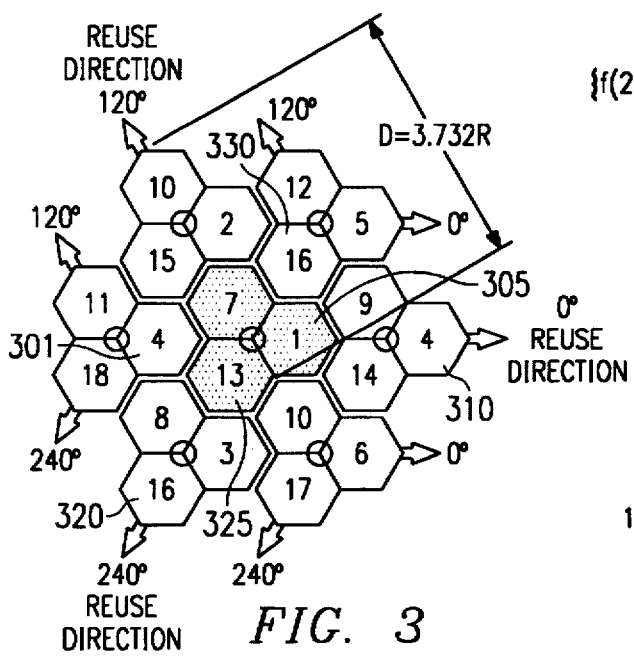
FIG. 3 shows a cluster of seven tri-cell groups with directional frequency reuse in alternate cells in accordance with the present invention.

FIG. 3 illustrates the preferred embodiment that is based on 18 frequency groups. In this embodiment, three sets of alternate frequency groups are directionalized along each axis and reused according to the following principle:

| | | |
|---|---|---|
| $\{f(0°)\}_1 = 2, 5, 2, 5, \ldots$ | Direction = 0° | (4) |
| $\{f(0°)\}_2 = 1, 4, 1, 4, \ldots$ | | |
| $\{f(0°)\}_3 = 3, 6, 3, 6, \ldots$ | | |
| $\{f(120°)\}_1 = 9, 12, 9, 12, \ldots$ | Direction = 120° | (5) |
| $\{f(120°)\}_2 = 7, 10, 7, 10, \ldots$ | | |
| $\{f(120°)\}_3 = 8, 11, 8, 11, \ldots$ | | |
| $\{f(240°)\}_1 = 15, 18, 15, 18, \ldots$ | Direction = 240° | (6) |
| $\{f(240°)\}_2 = 13, 16, 13, 16, \ldots$ | | |
| $\{f(240°)\}_3 = 14, 17, 14, 17, \ldots$ | | |

A cellular cluster, comprised of seven tri-cell groups, is illustrated in FIG. 3. These cellular clusters are reused consistently throughout the geographical service area. The number in each cell represents the frequency group assigned to that cell. Each frequency group is comprised of 395/18≈22 voice channels. Alternate embodiments that use other multiples of 9 will have different numbers of voice channels assigned to each frequency group.

As an example, FIG. 3 shows that, in the 0° direction, the frequency groups are lined up as 4 (301), 1 (305), and 4 (310). In the 240° direction, the frequency groups are lined up as 16 (320), 13 (325), and 16 (330).

The directional reuse plan not only uses the antenna front-to-back ratio but also isolates adjacent sites from adjacent channels. Adjacent channel interference is thereby reduced.

The frequency reuse distance in this scheme is geometrically computed from FIG. 3 as $$D=2(R+0.866R)=3.732R \qquad (7)$$

Reuse distance, D, is illustrated in FIG. 3 in the 120° direction between the two uses of frequency group 15. The reuse distance translates into a reuse plan of N=6.

The corresponding theoretical subscriber capacity is approximately 395/18≈22 voice channels per sector and 22×3=66 voice channels per tri-cell group.

The standard Grade of Service (GOS) for AMPS is 2% and is well known in the art. This means that it is acceptable for 2% of the calls in a cellular service provider's area to be blocked by some means such as buildings or terrain. Using this GOS, the present invention provides 14.9 erlang per sector, as determined from the standard cellular traffic table well known in the art. Since there are three sectors per tri-cell group, the present invention provides 14.9×3=44.7 erl. per tri-cell group. This is an improvement of more than 30% over the prior art.

The C/I prediction equation, well known in the art, is $$C/I = 10\log\left[\left\{\frac{D}{R}\right\}^\gamma\right] \qquad (8)$$

where N=6 (in the equation D/R=√3N) and γ is the pathloss slope, also referred to in the art as the propagation constant. The pathloss slope is the rate of decay of signal strength as a function of distance. In the preferred embodiment of the present invention, since there is only one interfering cell directly behind each cell, the C/I is approximately 25 dB in an urban (γ=4) environment.

Pathloss slope constants are well known in the radiotelephone art. The pathloss slope increases as the environment surrounding the cells becomes more crowded with buildings and other obstructions. These values range from 2 for free space with no obstructions, 2.5 for rural areas, 3–3.5 for suburban areas, 3.5–4 for urban areas, and 4–4.5 for dense urban areas.

Figure 4:
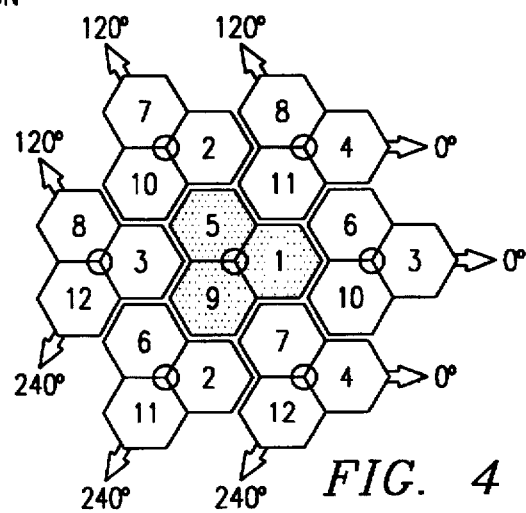
FIG. 4 shows a cluster of seven tri-cell groups with directional frequency reuse in accordance with an alternate embodiment of the present invention.

FIG. 4 illustrates an alternate embodiment of the present invention based on 12 or multiples of 12 frequency groups. This is accomplished using a process similar to the preferred embodiment. In the embodiment of FIG. 4, the 12 channel groups are directionalized as:

$$\{f(0°)\}1 = 2, 4, 2, \ldots \qquad (9)$$
$$\{f(0°)\}2 = 3, 1, 3, \ldots$$
$$\{f(0°)\}3 = 2, 4, 2, \ldots$$
$$\{f(120°)\}1 = 6, 8, 6, \ldots \qquad (10)$$
$$\{f(120°)\}2 = 7, 5, 7, \ldots$$
$$\{f(120°)\}3 = 6, 8, 6, \ldots$$
$$\{f(240°)\}1 = 10, 12, 10, \ldots \qquad (11)$$
$$\{f(240°)\}2 = 11, 9, 11, \ldots$$
$$\{f(240°)\}3 = 10, 12, 10, \ldots$$

The N=4 directional frequency reuse plan shown in FIG. 4, where each reuse frequency uses the antenna front-to-back ratio, is consistent throughout the service area. Moreover, adjacent channels are removed from adjacent sites to reduce adjacent channel interference.

The frequency reuse distance in this alternate embodiment is only $D/R = \sqrt{3N} = 3.464$. The C/I prediction equation for this embodiment is the same as that used in the preferred embodiment.

The channel capacity of this alternate embodiment is $395/12 = 33$ channels per sector and $33 \times 3 = 99$ channels per tri-cell group. At 2% GOS, this translates into 24.6 erl. per sector and $24.6 \times 3 = 73.8$ erl. per tri-cell group.

In summary, the directional frequency allocation plans of the present invention fully exploits the antenna front-to-back ratio and provides greater frequency reuse than the prior art while still providing acceptable co-channel and adjacent channel interference. Additional benefits include trunking efficiency, reduced hardware and software complexities, and reduced cost.

I claim:

1. A method for frequency allocation in a cellular system, the cellular system having a plurality of available frequencies and comprising a plurality of cells, the method comprising the steps of:

forming a tri-cell group from three of the plurality of cells, the tri-cell group having three axes of frequency use;

forming a cellular cluster from seven of the at least one tri-cell groups, the cellular cluster having a plurality of layers for each frequency use axis;

grouping the plurality of available frequencies into a predetermined number of frequency groups;

locating a plurality of antennas substantially in the center of each tri-cell group, each antenna of the plurality of antennas radiating into a predetermined sector of the tri-cell group; and allocating the frequency groups such that a first frequency group is used only along a first frequency use axis, of the three frequency use axes, in the cellular cluster.

2. The method of claim 1 wherein the predetermined sector is a 120° sector that covers a cell of the tri-cell group.

3. The method of claim 1 and further including the step of repeating the cellular cluster to cover a geographical region.

4. The method of claim 1 wherein the step of allocating the frequency groups further includes allocating the frequency groups such that the first frequency group alternates with a second frequency group along the first frequency use axis.

5. The method of claim 1 wherein the predetermined number of frequency groups is equal to a multiple of 9.

6. The method of claim 1 wherein the predetermined number of frequency groups is equal to a multiple of 12.

7. A method for frequency allocation in a cellular system, the cellular system having a plurality of available frequencies and comprising a plurality of cells, the method comprising the steps of:

forming a tri-cell group comprising three of the plurality of cells, the tri-cell group having three axes of frequency use;

forming a cellular cluster from seven of the tri-cell groups, the cellular cluster having a plurality of layers for each frequency use axis;

grouping the plurality of available frequencies into a multiple of 9 frequency groups;

locating a plurality of antennas in a location that is substantially central to each of the tri-cell groups, each antenna radiating a 120° pattern such that each antenna radiation pattern substantially covers a different cell of the tri-cell group; and assigning a first frequency group of the multiple of 9 frequency groups to each antenna such that the first frequency group is continuously repeated along a first axis, of the three frequency use axes, of the cellular cluster.

8. A cellular communication system for the efficient reuse of a plurality of channel frequencies, the system comprising:

a plurality of cells that are grouped into tri-cell groups comprising three cells of the plurality of cells, the tri-cell groups being further grouped into cellular clusters comprising seven tri-cell groups, each tri-cell group having a plurality of frequency use axes;

a plurality of directional antennas located substantially in the center of each tri-cell group, each antenna oriented such that it radiates into a different cell of the tri-cell group; and a plurality of transceivers coupled to the plurality of antennas, each transceiver operating on at least one channel frequency of the plurality of channel frequencies such that a first and a second channel frequency alternate along each frequency use axis.

9. A cellular communication system for the efficient reuse of a plurality of channel frequencies, the system comprising:

a plurality of cells that are grouped into tri-cell groups comprising three cells of the plurality of cells, the tri-cell groups being further grouped into cellular clusters comprising seven tri-cell groups, each tri-cell group having a plurality of frequency use axes;

a plurality of directional antennas located substantially in the center of each tri-cell group, each antenna oriented such that it radiates into a different cell of the tri-cell group; and a plurality of transceivers coupled to the plurality of antennas, each transceiver operating on at least one channel frequency of the plurality of channel frequencies such that a first channel frequency is reused only along a first frequency use axis of the plurality of frequency use axes.

* * * * *